US008885833B2

(12) United States Patent
Nick et al.

(10) Patent No.: US 8,885,833 B2
(45) Date of Patent: Nov. 11, 2014

(54) ONE-TIME RECOVERY CREDENTIALS FOR ENCRYPTED DATA ACCESS

(75) Inventors: Benjamin E. Nick, Bellevue, WA (US); Magnus Bo Gustaf Nyström, Sammamish, WA (US); Cristian M. Ilac, Sammamish, WA (US); Niels T. Ferguson, Redmond, WA (US); Nils Dussart, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 214 days.

(21) Appl. No.: 13/084,207

(22) Filed: Apr. 11, 2011

(65) Prior Publication Data
US 2012/0257759 A1    Oct. 11, 2012

(51) Int. Cl.
  *H04L 9/08*     (2006.01)
  *G06F 21/62*    (2013.01)
  *H04L 9/00*     (2006.01)

(52) U.S. Cl.
  CPC .......... *H04L 9/0894* (2013.01); *G06F 21/6209* (2013.01); *H04L 9/0822* (2013.01)
  USPC ........... 380/286; 380/259; 380/260; 380/261; 380/262; 380/263; 380/264; 380/265; 380/266; 380/277

(58) Field of Classification Search
  USPC .................................. 380/286, 277
  See application file for complete search history.

(56) References Cited

U.S. PATENT DOCUMENTS

| | | | |
|---|---|---|---|
| 5,768,373 A * | 6/1998 | Lohstroh et al. | 380/286 |
| 5,963,646 A * | 10/1999 | Fielder et al. | 380/259 |
| 6,754,349 B1 * | 6/2004 | Arthan | 380/286 |
| 7,540,022 B2 | 5/2009 | Barari et al. | |
| 2001/0056409 A1 * | 12/2001 | Bellovin et al. | 705/64 |
| 2005/0239440 A1 * | 10/2005 | Chen et al. | 455/411 |
| 2007/0130472 A1 | 6/2007 | Buer et al. | |
| 2007/0250923 A1 | 10/2007 | M'Raihi | |
| 2008/0276098 A1 | 11/2008 | Florencio et al. | |
| 2009/0235339 A1 | 9/2009 | Mennes et al. | |
| 2009/0313687 A1 | 12/2009 | Popp et al. | |

(Continued)

OTHER PUBLICATIONS

"Enhancing One-Time Passwords for Protection Against Real-Time Phishing Attacks", Retrieved at << http://www.rsa.com/rsalabs/technotes/One-TimePWWP.pdf >>, Nov. 19, 2009, pp. 12.

(Continued)

*Primary Examiner* — Evans Desrosiers
*Assistant Examiner* — Vu V Tran
(74) *Attorney, Agent, or Firm* — Timothy Churna; Kate Drakos; Micky Minhas

(57) ABSTRACT

A key recovery request for a device is received at a key recovery service and a particular one-time recovery credential in a sequence of multiple one-time recovery credentials is identified. In the sequence of multiple one-time recovery credentials, previous one-time recovery credentials in the sequence are indeterminable given subsequent one-time recovery credentials in the sequence. A recovery key associated with the device is also identified. The particular one-time recovery credential in the sequence is generated based on the recovery key, and is returned in response to the key recovery request. The particular one-time recovery credential can then be used by the device to decrypt encrypted data stored on a storage media of the device.

20 Claims, 5 Drawing Sheets

(56) References Cited

U.S. PATENT DOCUMENTS

| | | | |
|---|---|---|---|
| 2010/0142713 A1* | 6/2010 | Perlman | 380/286 |
| 2010/0172504 A1* | 7/2010 | Allen et al. | 380/286 |
| 2010/0263029 A1 | 10/2010 | Tohmo et al. | |
| 2010/0299731 A1 | 11/2010 | Atkinson | |
| 2011/0208965 A1* | 8/2011 | Machani | 713/168 |

OTHER PUBLICATIONS

"Access Control", Retrieved at << http://www.mhprofessional.com/downloadsproducts/0072225785/0072225785_ch02.pdf >>, Retrieved Date: Jan. 6, 2011, pp. 40.

"OTP C400 Token", Retrieved at << http://www.ftsafe.com/products/otpc400.html >>, Retrieved Date: Jan. 7, 2011, p. 1.

* cited by examiner

ONE-TIME RECOVERY CREDENTIALS FOR ENCRYPTED DATA ACCESS

BACKGROUND

In order to protect data from being seen by others, a user can store data on his or her computer in an encrypted form. The data is encrypted using an appropriate security key or keys, and decrypted only if an authentication process is successful. This authentication process can involve various actions, such as the user providing a correct password. However, situations can arise in which the authentication process fails, such as if the user forgets his or her password. Such situations can be problematic because the user is unable to have data on his or her computer decrypted, even though he or she is a legitimate user of the computer.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, in a key recovery service a key recovery request for a particular device is received and a recovery key associated with the particular device is identified. A particular one-time recovery credential (e.g., a one-time password) in a sequence of multiple one-time recovery credentials is also identified, with previous one-time recovery credentials in the sequence of multiple one-time recovery credentials being indeterminable given subsequent one-time recovery credentials in the sequence. The particular one-time recovery credential in the sequence is generated based on the recovery key, and is returned in response to the key recovery request.

In accordance with one or more aspects, in a device a one-time recovery credential that is one of multiple one-time recovery credentials in a sequence of one-time recovery credentials is received. In the sequence of one-time recovery credentials, previous one-time recovery credentials are indeterminable given subsequent one-time recovery credentials in the sequence. A key is decrypted using the one-time recovery credential, and is used to decrypt encrypted data stored on a storage media of the device.

BRIEF DESCRIPTION OF THE DRAWINGS

The same numbers are used throughout the drawings to reference like features.

DETAILED DESCRIPTION

Figure 1:
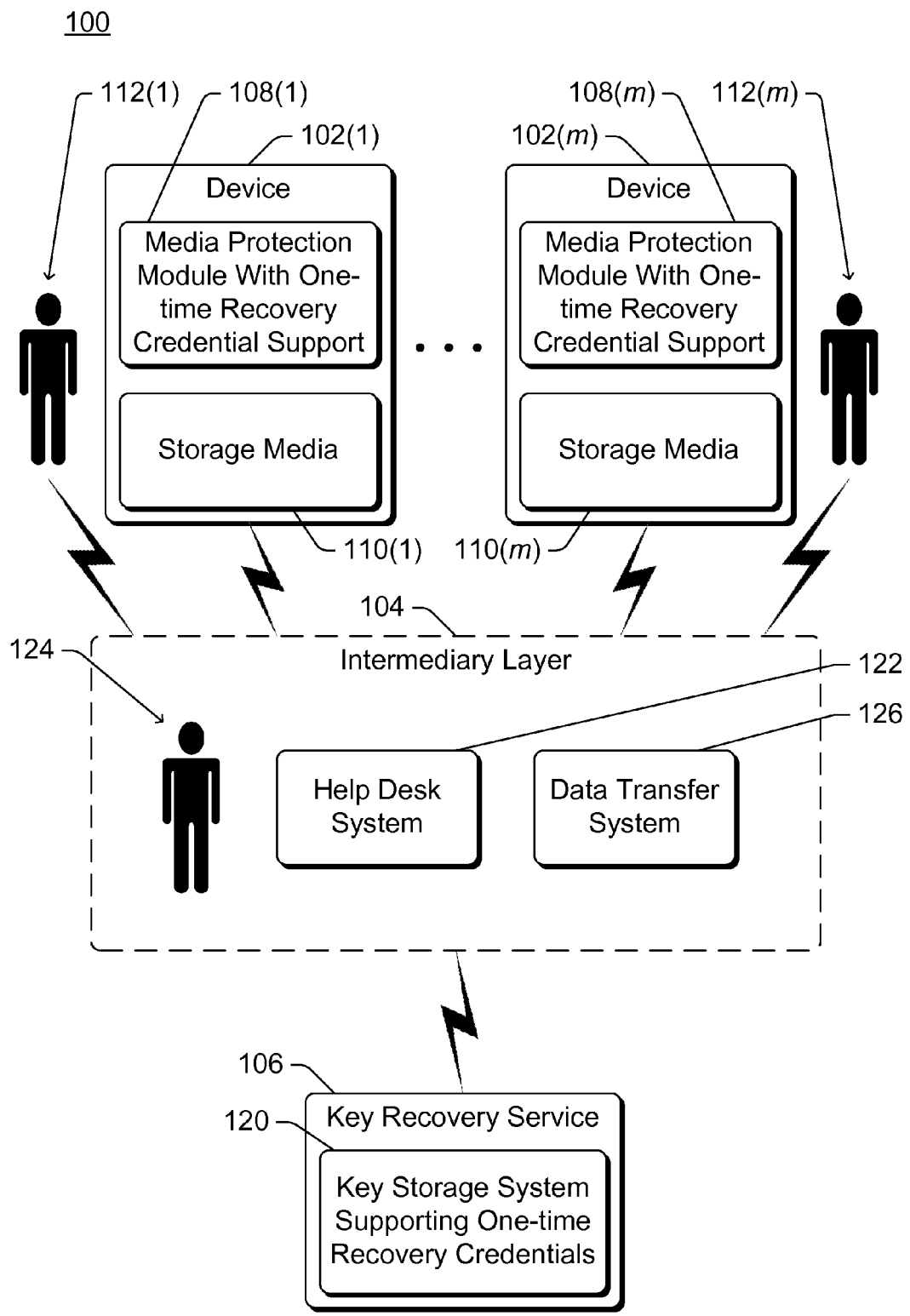
FIG. 1 illustrates an example system implementing the one-time recovery credentials for encrypted data access in accordance with one or more embodiments.

One-time recovery credentials for encrypted data access are discussed herein. Data on a storage media accessed by a device is stored in encrypted form. An authentication process is used by the device to verify that a user can access the data, and if the authentication process is successful access to a security key is permitted to decrypt the encrypted data on the storage media. If the authentication process fails, such as due to a user forgetting a password or other reasons, the user can access a help desk technician or other intermediary to obtain a one-time recovery credential. The intermediary can be accessed using the device that includes the storage media or a different device, such as a phone. The user proves that he or she is a legitimate user of the device to the intermediary and provides to the intermediary an identifier, obtained from the device, of a particular one-time recovery credential in a sequence of one-time recovery credentials. The intermediary accesses a key recovery service, which returns the identified one-time recovery credential to the intermediary, and the intermediary returns the identified one-time recovery credential to the user. Alternatively, the user can access the key recovery service directly rather than via the intermediary. The user can then enter the one-time recovery credential on the device, which allows access to the security key so that the encrypted data on the storage media can be decrypted.

References are made herein to cryptography, which can include symmetric key cryptography, public key cryptography and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity keeps the private key a secret. Without the private key it is computationally very difficult to decrypt data that is encrypted using the public key. Using some public key cryptography algorithms, data can be encrypted by any entity with the public key and only decrypted by an entity with the corresponding private key. Additionally, using some public key cryptography algorithms, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key cryptography, on the other hand, a shared key (also referred to as a symmetric key) is known by and kept secret by the two entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key. Additionally, authentication codes or message authentication codes can be generated based on symmetric key cryptography, such as using a keyed-hash message authentication code mechanism. Any entity with the shared key can generate and verify the authentication code or message authentication code. For example, a trusted third party can generate a symmetric key based on an identity of a particular entity, and then can both generate and verify the authentication codes or message authentication codes for that particular entity (e.g., by encrypting or decrypting the data using the symmetric key).

FIG. 1 illustrates an example system 100 implementing the one-time recovery credentials for encrypted data access in accordance with one or more embodiments. System 100 includes multiple (m) devices 102(1), . . . , 102(m), an optional intermediary layer 104, and a key recovery service 106. Devices 102, entities in optional intermediary layer 104, and key recovery service 106 can communicate with one another via a variety of different communication networks, such as the Internet, a local area network (LAN), a telephone network, an intranet, other public and/or proprietary networks, combinations thereof, and so forth.

Each device 102 can be a variety of different types of devices, such as a physical device or a virtual device. For example, device 102 can be a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Device 102 can also be a virtual device, such as a virtual machine running on a physical device. A virtual machine can be run on any of a variety of different types of physical devices (e.g., any of the various types listed above). Different devices 102 can be the same or different types of devices.

Each device 102 includes a media protection module 108 and a storage media 110. Each storage media 110 can be a storage device implemented using a variety of different technologies, such as a flash memory device, a magnetic disk, an optical disc, combinations thereof, and so forth. Each storage media 110 can be permanently mounted in a device 102, can be removably mounted in or otherwise coupled to a device 102, or can be otherwise in communication with (e.g., wirelessly coupled to) a device 102. Each storage media 110 can also be a portion of a storage device that is treated by devices 102 and operating systems logically as a storage device. For example, a storage media 110 can be a partition of a hard drive, a portion of a flash memory device, and so forth. Each storage media 110 can also be a virtual storage media, such as a virtual disk, that can be mounted by a device 102 (e.g., by a virtual machine running on a device 102). For example, a storage media 110 can be a Virtual Hard Disk (VHD) file (e.g., on a flash memory device, on a magnetic disk, etc.) and mounted as a disk by a virtual machine. Additional information regarding VHD files is available from Microsoft Corporation of Redmond, Wash. Thus, each storage media 110 can be a physical storage media or a virtual storage media. Although each device 102 is illustrated as having one storage media, it should be noted that a device 102 can have any number of storage media 110.

Media protection module 108 controls access to storage media 110, encrypting data on storage media 110 and allowing only authorized users 112 to access the encrypted data (e.g., decrypt and read the data, write encrypted data, etc.). Media protection module 108 can encrypt and decrypt data on storage media 110 using symmetric key and/or public key cryptography. All data on storage media 110 can be encrypted or only a portion of the data stored on storage media 110 is encrypted. An authentication process is followed by media protection module 108 via which a user 112 can prove to media protection module 108 that the user 112 is authorized to access the encrypted data in different manners. The authentication process can include the user providing a password, providing a personal identification number, presenting a smartcard storing user credentials, providing biometric information, and so forth. In one or more embodiments, data on storage media 110 is encrypted using one or more keys (e.g., referred to as one or more volume encryption keys), and media protection module 108 allows access to those one or more keys for a user 112 of a device 102 only if the user 112 proves that he or she is authorized to access the encrypted data on storage media 110.

Media protection module 108 includes one-time recovery credential support, allowing a user 112 to access the encrypted data on storage media 110 if the authentication process fails. The authentication process can fail for various reasons, such as the user forgetting a password or personal identification number, the user having misplaced or forgotten to bring his or her smartcard, and so forth. To support the one-time recovery credential, media protection module 108 uses a sequence of one-time recovery credentials (also referred to as a credential sequence) to protect one or more keys used to decrypt data on storage media 110. These credentials can be, for example, a password, an encrypted one of the one-time recovery credentials in the credential sequence, and so forth.

Media protection module 108 can protect one or more keys used to decrypt data on storage media 110 in different manners, such as by encrypting (or otherwise protecting) a recovery key using a current one-time recovery credential from this sequence, and allowing the recovery key to be used to access the encrypted data on storage media 110 (e.g., by storing, encrypted with the recovery key, one or more keys and/or other information used to encrypt the data on storage media 110). Thus, at any given time the current one-time recovery credential can be used to retrieve the recovery key and access the encrypted data on storage media 110, although the current one-time recovery credential can change over time as discussed in more detail below. Alternatively, media protection module 108 can encrypt (or otherwise protect), using a current one-time recovery credential from this sequence, one or more other keys and/or other information used to encrypt the data on storage media 110. Thus, at any given time the current one-time recovery credential can be used to access the encrypted data on storage media 110, although the current one-time recovery credential can change over time as discussed in more detail below.

The one-time recovery credentials in the credential sequence are generated using one or more functions that generate the one-time recovery credentials in the credential sequence and identifiers of the one-time recovery credentials in the credential sequence. These one or more functions can include key derivation functions and/or other functions. These one or more functions have the property that, given a particular one-time recovery credential in the credential sequence, previous one-time recovery credentials in the credential sequence cannot be determined (are indeterminable) using the particular one-time recovery credential. Additionally, in one or more embodiments one of the one-time recovery credentials in the credential sequence can be used to retrieve the recovery key, but other one-time recovery credentials in the credential sequence cannot be used to retrieve the recovery key.

Generally, the one or more functions that generate the one-time recovery credentials can be defined as:

$$N[i]=\text{Function1}(R,i)$$

$$P[i]=\text{Function2}(R,i)$$

in which R represents the recovery key, i represents a particular location in the credential sequence, Function1 represents a mathematical function, Function2 represents a mathematical function, N[i] is an identifier of the $i^{th}$ one-time recovery credential in the credential sequence, and P[i] is the $i^{th}$ one-time recovery credential in the credential sequence. Two different functions (Function1 and Function2) can be used to generate the identifier of the $i^{th}$ one-time recovery credential in the credential sequence and the $i^{th}$ one-time recovery credential in the credential sequence, or alternatively a single function can be used to generate the identifier of the $i^{th}$ one-time recovery credential in the credential sequence and the $i^{th}$ one-time recovery credential in the credential sequence. For example, a single function (Function2) can be used to generate the $i^{th}$ one-time recovery credential in the credential sequence and i can be the identifier of the $i^{th}$ one-time recovery credential in the credential sequence. By way of another example, a single function can be used to generate values that are used as both the identifier of the $i^{th}$ one-time recovery credential in the credential sequence and the $i^{th}$ one-time recovery credential in the credential sequence.

In one or more embodiments, the one-time recovery credentials in the credential sequence are generated using a one-way hash function (also referred to as a cryptographic hash function). A one-way hash function refers to a function that generates an output value (also referred to as a hash value) based on an input to the one-way hash function, but it is infeasible (e.g., computationally very difficult) to determine the input based on the output value. Various different conventional or proprietary one-way hash functions can be used, such as SHA-1 (Secure Hash Algorithm 1) or SHA-2, Whirlpool, Tiger, and so forth. An initial or beginning one-time recovery credential in the credential sequence is generated by using the recovery key as the input to the one-way hash function. Each subsequent one-time recovery credential in the credential sequence is generated by using the previous one-time recovery credential in the credential sequence as the input to the one-way hash function. Thus, subsequent one-time recovery credentials in the credential sequence can be determined (are determinable) given a previous one-time recovery credential in the credential sequence, but previous one-time recovery credentials in the credential sequence cannot be determined (are indeterminable) given a subsequent one-time recovery credential in the credential sequence.

The number of one-time recovery credentials in the credential sequence can vary by implementation, and can vary for different devices 102. For example, the number of one-time recovery credentials in the credential sequence for a particular device 102 can be selected to be at least a threshold number greater than a number of times the user of that device 102 is expected to forget his or her password, to be a number of one-time recovery credentials expected to be used over a given time period (e.g., a year), to be at least equal to a total number of one-time recovery credentials that are expected to be needed, and so forth.

Key recovery service 106 includes a key storage system 120 that also supports one-time recovery credentials. Key recovery service 106 can be implemented by one or more of various different types of devices, analogous to the discussion of devices 102 above. One or more recovery keys for each device 102 is also stored by key storage system 120. Key storage system 120 is also aware of the one or more functions used by media protection modules 108, and thus can generate the same credential sequences as media protection modules 108 can generate.

In the discussions herein, users 112 are discussed as requesting and receiving one-time recovery credentials via an intermediary layer 104. Alternatively, one-time recovery credential requests can be provided from the user 112 (or device 102) to key recovery service 106 directly rather than via intermediary layer 104. In embodiments without an intermediary layer 104, devices 102 and key recovery service 106 perform the same operations as if intermediary layer 104 were present. Additionally, verification that user 112 is a legitimate user of device 102, as discussed in more detail below, is performed by key recovery service 106 (or another component or service operating in conjunction with key recovery service 106) rather than intermediary layer 104.

If the authentication process at a device 102 fails, then user 112 requests a one-time recovery credential from intermediary layer 104, providing an identifier of a particular one-time recovery credential in the credential sequence that is desired. Intermediary layer 104 can include any number of different entities, such as a help desk system 122, a help desk technician 124, a data transfer or authentication system 126, and so forth. Systems 122 and/or 126 can be implemented by one or more of various different types of devices, analogous to the discussion of devices 102 above.

The user 112 proves to one or more entities in intermediary layer 104 that the user 112 is a legitimate user of the device 102. The user 112 can provide such proof in different manners, such as by providing secret information to a help desk technician 124 that the technician 124 can verify using help desk system 122, by being accessible at a call-back number (e.g., a cell phone) known to the help desk system 122, by speaking a particular access phrase that data transfer or authentication system 126 recognizes as being the user's voice, and so forth. It should be noted that the user 112 can, and oftentimes does, access an entity of intermediary layer 104 without use of the device 102 for which the authentication process failed (e.g., the user can place a phone call using a different device to an entity of intermediary layer 104).

If the user 112 cannot prove that he or she is a legitimate user of the device 102, then the request for the one-time recovery credential is denied by intermediary layer 104. However, if the user successfully proves that he or she is a legitimate user of the device 102, then an entity of intermediary layer 104 provides the one-time recovery credential request to key recovery service 106, including the identifier of the particular one-time recovery credential in the credential sequence that is desired. Key storage system 120 can store recovery keys for various devices 102, and can identify the recovery key for the device 102 having the storage media 110 that the user is desiring to access in a variety of different manners as discussed in more detail below. Based on the recovery key for that device 102 and the identifier of the particular one-time recovery credential in the credential sequence that is desired, key storage system 120 generates the identified one-time recovery credential in the credential sequence using the one or more function as discussed above.

In embodiments in which media protection module 108 stores the recovery key encrypted using the current one-time recovery credential, in response to the request for a one-time recovery credential the key recovery service 106 returns to an entity of intermediary layer 104 the one-time recovery credential that key storage system 120 generates. The entity of intermediary layer 104, in turn, returns the one-time recovery credential received from key recovery service 106 to the requesting user 112. The entity of intermediary layer 104 can return the one-time recovery credential to the requesting user 112 in various manners, such as by speaking the one-time recovery credential while communicating with the requesting user 112 via a phone, sending a text message or instant message to the user, placing the credential on a remote service or portal accessible to the requesting user 112 (e.g., via another device other than the device 102 for which the authentication process failed), and so forth. The requesting user 112 provides the one-time recovery credential to media protection module 108, which in turn uses the one-time recovery credential to decrypt the recovery key. The recovery key can then be used to access the encrypted data on storage media 110.

Additionally, media protection module 108 generates a new one-time recovery credential, which is a previous one-time recovery credential in the credential sequence (previous in the sequence relative to the current one-time recovery credential, the current one-time recovery credential being the one-time recovery credential received from key recovery service 106). Media protection module 108 encrypts the recovery key using the new one-time recovery credential and deletes the previously encrypted recovery key (that was encrypted using the current one-time recovery credential). This new one-time recovery credential is then the current one-time recovery credential the next time that a one-time recovery credential is desired.

The one-time recovery credential allows the recovery key to be decrypted a particular number of times (e.g., once) or during a particular time period. The recovery key may be usable for a particular amount of time (e.g., for a particular session during which the user 112 is logged into device 102, for a particular time duration (e.g., a particular day), and so forth). Because the new one-time recovery credential is generated and the recovery key encrypted with the current one-time recovery credential is deleted, the current one-time recovery credential can no longer be used to decrypt the recovery key. Further, because the new one-time recovery credential is previous in the credential sequence relative to the current one-time recovery credential, the new one-time recovery credential is not determinable given the current one-time recovery credential. Thus, the user 112 (or other malicious users) is prevented from using one-time recovery credentials that were previously obtained from key recovery service 106 to decrypt the recovery key.

Furthermore, the one-time recovery credential is passed through intermediary layer 104, not the recovery key. Accordingly, the recovery key is not exposed to entities in intermediary layer 104. Additionally, communications between user 112 and intermediary layer 104, as well as between intermediary layer 104 and key recovery service 106, can be performed using unsecure (e.g., unencrypted or otherwise accessible to third parties) communication channels. Because the recovery key is not returned to the user 112 by key recovery service 106, the recovery key is not exposed to any malicious user or program monitoring communications between user 112 and intermediary layer 104, or to any malicious user or program monitoring communications between intermediary layer 104 and key recovery service 106. Further, even if a malicious user or program were to eavesdrop on communications between user 112 and intermediary layer 104, or between intermediary layer 104 and key recovery service 106, because the new one-time recovery credential is created the malicious user or program would not be able to subsequently use any one-time recovery credential that the eavesdropping revealed to decrypt the recovery key on a device 102.

Alternatively, in embodiments in which media protection module 108 stores the one or more keys and/or other information used to encrypt the data on storage media 110 encrypted using the current one-time recovery credential (rather than a recovery key encrypted using the current one-time recovery credential), in response to the request for a one-time recovery credential key recovery service 106 returns to an entity of intermediary layer 104 the one-time recovery credential that key storage system 120 generates (the current one-time recovery credential). Additionally, key storage system 120 selects a new one-time recovery credential, which is a previous one-time recovery credential in the credential sequence (previous in the sequence relative to the current one-time recovery credential, the current one-time recovery credential being the one-time recovery credential received from key recovery service 106). Key storage system 120 encrypts the new one-time recovery credential with the current one-time recovery credential, and returns to an entity of intermediary layer 104 the new one-time recovery credential encrypted with the current one-time recovery credential (and optionally an identifier of the new one-time recovery credential in the credential sequence). The entity of intermediary layer 104 returns the current one-time recovery credential, as well as the new one-time recovery credential encrypted with the current one-time recovery credential (and optionally an identifier of the new one-time recovery credential in the credential sequence), that are received from key recovery service 106 to the requesting user 112 in various manners analogous to the discussion above. The requesting user 112 provides the one-time recovery credential and the new one-time recovery credential encrypted with the current one-time recovery credential (and optionally an identifier of the new one-time recovery credential in the credential sequence) to media protection module 108. Alternatively, the current one-time recovery credential, as well as the new one-time recovery credential encrypted with the current one-time recovery credential (and optionally an identifier of the new one-time recovery credential in the credential sequence), can be returned to the device 102 of the requesting user 112 rather than to the requesting user 112.

Media protection module 108 uses the received current one-time recovery credential to decrypt the one or more keys and/or other information used to encrypt the data on storage media 110. Media protection module 108 also uses the current one-time recovery credential to decrypt the new one-time recovery credential, and encrypts the one or more keys and/or other information used to encrypt the data on storage media 110 with the new one-time recovery credential. This new one-time recovery credential is then the current one-time recovery credential the next time that a one-time recovery credential is desired.

The one-time recovery credential can allow the one or more keys and/or other information used to encrypt the data on storage media 110 to be decrypted a particular number of times (e.g., once) or during a particular time period. The one or more keys and/or other information may be usable for a particular amount of time (e.g., for a particular session during which the user 112 is logged into device 102, for a particular time duration (e.g., a particular day), and so forth). Because the new one-time recovery credential is generated and the one or more keys and/or other information used to encrypt the data on storage media 110 encrypted with the current one-time recovery credential is deleted, the current one-time recovery credential can no longer be used to decrypt the one or more keys and/or other information used to encrypt the data on storage media 110. Further, because the new one-time recovery credential is previous in the credential sequence relative to the current one-time recovery credential, the new one-time recovery credential is not determinable given the current one-time recovery credential. Thus, the user 112 (or other malicious users) is prevented from using one-time recovery credentials that were previously obtained from key recovery service 106 to decrypt the one or more keys and/or other information used to encrypt the data on storage media 110.

Additionally, similar to the discussion above regarding the recovery key, the one or more keys and/or other information are not passed through intermediary layer 104 and thus are protected against malicious users or programs. Further, because the one-time recovery credential is used to encrypt the one or more keys and/or other information used to encrypt the data on storage media 110, the recovery key need not be decrypted and exposed while using the one-time recovery credentials.

Figure 2:
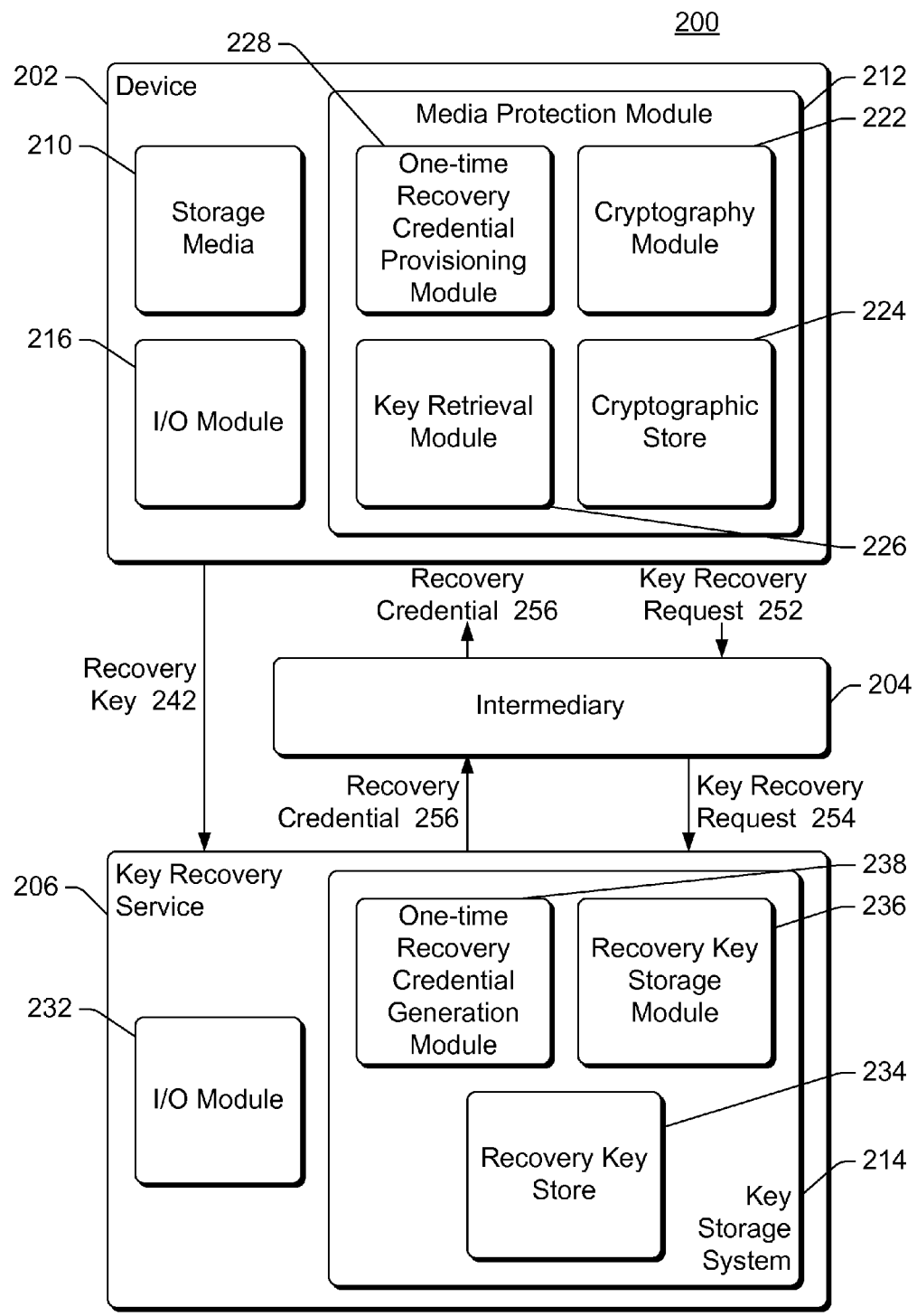
FIG. 2 illustrates an example system implementing the one-time recovery credentials for encrypted data access in additional detail in accordance with one or more embodiments.

FIG. 2 illustrates an example system 200 implementing the one-time recovery credentials for encrypted data access in additional detail in accordance with one or more embodiments. System 200 includes a device 202 (which can be a device 102 of FIG. 1), an intermediary 204 (which can be one or more of the entities of intermediary layer 104 of FIG. 1), and a key recovery service 206 (which can be a key recovery service 106 of FIG. 1). Intermediary 204 is optional, analogous to intermediary layer 104 discussed above. Device 202 includes a storage media 210 (which can be a storage media 110 of FIG. 1) and a media protection module 212 (which can be a media protection module 108 of FIG. 1). Key recovery service 206 includes a key storage system 214 (which can be a key storage system 120 of FIG. 1).

Various modules are shown within device 202 and key recovery service 206. Although shown as separate modules, it should be noted that the functionality of two or more (or portions of two or more) of the illustrated modules can be combined into a single module. It should also be noted that the functionality of an illustrated module can be separated into two or more modules.

Device 202 also includes I/O module 216, which manages the input of data from a user of device 202 and the presentation of data to a user of device 202, as well as communication with key recovery service 206 and intermediary 204. I/O module 216 can receive a variety of different types of user inputs, such as key presses, gestures on a touchpad or touchscreen, audible inputs, and so forth. I/O module 216 can also present data to a user of device 202 in a variety of different manners, such as displaying the data, audibly playing back the data, and so forth. It is to be appreciated that device 202 can also include one or more additional components or modules for providing various additional functionality of device 202.

Media protection module 212 includes a cryptography module 222, a cryptographic store 224, a key retrieval module 226, and a one-time recovery credential provisioning module 228. Cryptography module 222 uses symmetric key and/or public key cryptography to perform the encryption and decryption discussed herein, such as encrypting and decrypting data stored on storage media 210, encrypting and decrypting recovery keys, and so forth. Cryptography module 222 can also implement one-way hash functions to generate hash values.

Cryptographic store 224 stores keys and/or other information supporting encryption and decryption performed by cryptography module 222. For example, cryptographic store 224 can store one or more of public keys of public/private key pairs, private keys of public/private key pairs, symmetric keys, certificates, recovery keys, and/or other data used for encrypting and/or decrypting data. Cryptographic store 224 can be maintained in a variety of different types of media of device 202, such as random access memory (RAM), flash memory, a magnetic disk, and so forth. Cryptographic store 224 can also optionally include an interface portion allowing other components and modules of device 202 to access data stored by cryptographic store 224. Such an interface portion of store 224 can be implemented in software, firmware, hardware, or combinations thereof.

Key retrieval module 226 manages retrieving of the key (a recovery key, one or more keys and/or other information used to encrypt the data on storage media 110, etc.) for device 202 based on a one-time recovery credential. Key retrieval module 226 communicates with cryptography module 222 to have the key decrypted given a one-time recovery credential received from key recovery service 206, and cryptography module 222 can in turn use the key (directly or by decrypting one or more other keys) to access encrypted data on storage media 210. In one or more embodiments, key retrieval module 226 also manages generation of a new one-time recovery credential on device 202, generating the new one-time recovery credential or communicating with cryptography module 222 at the appropriate times to generate the new one-time recovery credential.

In one or more embodiments, one-time recovery credential provisioning module 228 manages establishing the recovery key and the sequence of one-time recovery credentials for device 202. The recovery key and credential sequence is established so that both device 202 and key recovery service 206 know both the recovery key and credential sequence, and can be established in a variety of different manners as discussed below. Alternatively, in embodiments in which media protection module 108 stores the one or more keys and/or other information used to encrypt the data on storage media 110 encrypted using the current one-time recovery credential (rather than a recovery key encrypted using the current one-time recovery credential), device 202 need not know the recovery key because key recovery service 206 provides the new one-time recovery credential to device 202 as discussed above.

Key recovery service 206 includes I/O module 232, which manages communication with device 202 and/or intermediary 204. Key recovery service 206 also includes a key storage system 214, which includes a recovery key store 234, a recovery key storage module 236, and a one-time recovery credential generation module 238.

Recovery key storage module 236 manages recovery keys for devices 202 and the storing of recovery keys in recovery key store 234. Recovery key store 234 can be maintained in a variety of different types of media, such as RAM, flash memory, a magnetic disk, and so forth. The recovery keys are maintained in store 234 in a manner that associates the recovery keys with the corresponding devices, so that when a key recovery request is received for a particular device the appropriate recovery key can be retrieved from store 234.

One-time recovery credential generation module 238 generates the appropriate one-time recovery credential in the credential sequence in response to a key recovery request for a device 202. One-time recovery credential generation module 238 can determine the appropriate one-time recovery credential in the credential sequence for a particular key recovery request in a variety of different manners as discussed below.

In the discussions herein, reference is made to device 202 having a recovery key. However, it should be noted that a device 202 can have multiple different recovery keys. These different recovery keys can be used by device 202 in different manners, such as different recovery keys for different data on storage media 210, different recovery keys for different storage media 210 of device 202, and so forth. Similarly, it should be noted that a device 202 can have different keys to encrypt data stored on storage media 210. These different keys can be used by device 202 in different manners, such as different keys for different data on storage media 210, different keys for different storage media 210 of device 202, and so forth.

Key recovery service 206 (and optionally device 202) is aware of the recovery key for device 202. The recovery key can be established in device 202 and key recovery service 206 in a variety of different manners. Establishing the recovery key refers to generating or otherwise obtaining the recovery key, and storing the recovery key for subsequent use.

In one or more embodiments, one-time recovery credential provisioning module 228 generates the recovery key and provides the recovery key 242 to key recovery service 206. Recovery key 242 is typically communicated via a secure channel (e.g., encrypted), and stored in recovery key store 234. Module 228 can generate the recovery key in a variety of different conventional or proprietary manners, such as by generating a random number (or pseudo random number) to use as the random key, invoking a key generation module or service, and so forth.

In other embodiments, the recovery key is generated by another device or service. For example, key recovery service 206 can generate the recovery key and optionally provide the recovery key to device 202 (e.g., via a secure channel). By way of another example, another device or service (such as a device or service used by a manufacturer or distributor of device 202, a device or service used by an administrator of device 202, etc.) can generate the recovery key and provide the recovery key (e.g., via a secure channel) to key recovery service 206 and optionally device 202.

Regardless of the manner in which the recovery key is generated, the recovery key can be stored in cryptographic store 224 (encrypted using the current one-time recovery credential) and recovery key store 234. The recovery key can be stored in an encrypted form in recovery key store 234, or alternatively can be otherwise secured or protected by key recovery service 206 against malicious programs or users. Additionally, the recovery key is maintained by key storage system 214 as associated with device 202. An identifier of device 202 is provided to key recovery service 206 by device 202, or by another device or service from which the recovery key is obtained. The recovery key can be maintained in key storage system 214 as associated with device 202 in a variety of different manners, such as storing a key-identifier pair that includes both the recovery key and the identifier of device 202, or in other data structures that associate the recovery key and device 202.

Alternatively, in embodiments in which media protection module 108 stores the one or more keys and/or other information used to encrypt the data on storage media 110 encrypted using the current one-time recovery credential (rather than the recovery key encrypted with the current one-time recovery credential), the recovery key need not be stored in cryptographic store 224. Rather, key recovery service 206 can store the recovery key and use the recovery key to generate a new one-time recovery credential as discussed above, and device 202 need not maintain a record of the recovery key.

In one or more embodiments, multiple recovery keys can be associated with device 202, which can use the recovery keys (and/or credential sequences generated based on the recovery keys) in different manners. In such embodiments, these different recovery keys associated with device 202 can be identified separately, allowing key recovery service 206 to distinguish between the keys and identify the proper recovery key in response to a subsequent request for the recovery key. Different recovery keys associated with device 202 can be identified separately in different manners, such as including an additional key identifier for each recovery key associated with the same device, using different device identifiers for each key (although each such different device identifier is associated with the same device 202), and so forth.

It should be noted that although device 202 and key recovery service 206 can store the recovery key for device 202, device 202 and service 206 need not store, and typically do not store, the credential sequence. Rather, the one-time recovery credentials in the credential sequence can be generated by device 202 and/or key recovery service 206 on an as-needed basis.

To obtain a one-time recovery credential, a key recovery request 252 is communicated to intermediary 204. The key recovery request 252 is typically received from a user of device 202, such as by the user calling into a help desk technician with his or her phone. Alternatively, the key recovery request 252 can be received from another entity, such as device 202, another device (e.g., another device that has access to verification information of the user of device 202), and so forth. Intermediary 204 verifies that key recovery request 252 is received from a legitimate user of device 202. This verification can take a variety of different forms, such as the user providing a passphrase that is known to intermediary 204, intermediary 204 calling back the user at a number that is known to intermediary 204 (e.g., the user's cell phone number or work extension), and so forth. This verification can be, and typically is, performed between the user of device 202 and intermediary 204 but not using device 202. Rather, the verification is typically performed between the user of device 202 and intermediary 204 using a different device (e.g., the user's cell phone or office phone). Thus, this verification can take place even though device 202 may not have network access and/or may be running in just an operating system pre-boot environment.

If intermediary 204 determines that the key recovery request 252 is not received from a legitimate user, then intermediary 204 does not provide a key recovery request 254 to key recovery service 206. However, if intermediary 204 determines that the key recovery request is received from a legitimate user, then intermediary 204 provides key recovery request 254 to key recovery service 206 on behalf of the user of device 202.

Key recovery request 254 includes an identifier of device 202 as well as an identifier of a particular one-time recovery credential in the credential sequence. An indication of the current one-time recovery credential is provided to (or otherwise obtained by) key recovery service 206 so that key recovery service 206 generates the correct one-time recovery credential for device 202.

The identifier of device 202 can be received from the user of device 202, or alternatively obtained elsewhere. For example, intermediary 204 can obtain the identifier of device 202 from another component or service during the process of verifying that key recovery request 252 is received from a legitimate user.

The identifier of the particular one-time recovery credential in the credential sequence is also received from the user of device 202 or alternatively obtained elsewhere. For example, the identifier of the current one-time recovery credential can be displayed to the user of device 202 when the authentication process fails, and the user can provide this identifier of the current one-time recovery credential to intermediary 204 as the identifier of the particular one-time recovery credential.

By way of another example, intermediary 204 can maintain the identifier of the current one-time recovery credential for device 202, and provide this identifier of the current one-time recovery credential to intermediary 204 as the identifier of the particular one-time recovery credential.

In response to key recovery request 254, recovery key storage module 236 obtains, from recovery key store 234, the recovery key for device 202 (e.g., as identified in key recovery request 254). One-time recovery credential generation module 238 generates the identified one-time recovery credential based on the recovery key for device 202 and the one-way hash function, and returns the generated one-time recovery credential 256 to intermediary 204. Intermediary 204 in turn returns recovery credential 256 to the user of device 202. Recovery credential 256 can alternatively be returned to device 202 rather than the user of device 202.

The one-time recovery credentials in the credential sequence can be identified in different manners. In one or more embodiments, the one-time recovery credentials in the credential sequence have sequential numbers that identify the one-time recovery credentials in the credential sequence, with previous one-time recovery credentials in the credential sequence having smaller sequential numbers than subsequent one-time recovery credentials in the credential sequence. The one-time recovery credential for a particular one-time recovery credential in the credential sequence can be determined in different manners using one or more functions as discussed above. For example, the one-time recovery credential for a particular one-time recovery credential in the credential sequence can be determined by iteratively hashing the recovery key as follows:

$$hash^n(key)$$

where "hash" represents a one-way hash function, "key" represents the recovery key, and "n" represents the sequential number of the particular one-time recovery credential in the credential sequence (the largest value of n corresponding to the one-time recovery credential that is initially used to protect the one or more keys used to decrypt data on storage media 210). The first one-time recovery credential in the credential sequence is generated by using key as the input to the one-way hash function "hash", and each subsequent one-time recovery credential in the credential sequence is generated by using the previous one-time recovery credential in the credential sequence as the input to the one-way hash function "hash". The one-way hash function can also optionally take various other inputs, such as the iteration count of the one-time recovery credential (or previous one-time recovery credential) being generated.

In one or more embodiments in which the one-time recovery credentials in the credential sequence have sequential numbers, the sequential number of the current one-time recovery credential is maintained in cryptographic store 224. Key retrieval module 226 presents (e.g., displays) the sequential number of the current one-time recovery credential to a user of device 202, which in turn can provide the sequential number to intermediary 204. Key retrieval module 226 can present the sequential number in response to an input of a user of device 202 (e.g., an indication that the user has forgotten his or her password), in response to another event (such as a failed authentication process), and so forth. Key retrieval module 226 also decrements (e.g., by 1) the sequential number each time the current one-time recovery credential is used to decrypt the recovery key. So, each time the current one-time recovery credential is used to decrypt the recovery key, a previous one-time recovery credential in the credential sequence becomes the new current one-time recovery credential.

In other embodiments, the one-time recovery credentials in the credential sequence have associated numbers that identify the one-time recovery credentials in the credential sequence, but these associated numbers need not be sequential numbers. The associated numbers can be generated based on the hash values generated by the one-way hash function. The first one-time recovery credential in the credential sequence is generated by using the recovery key as the input to the one-way hash function, and each subsequent one-time recovery credential in the credential sequence is generated by using the previous one-time recovery credential in the credential sequence as the input to the one-way hash function as discussed above. However, a portion of the output of the one-way hash function is used as the one-time recovery credential and another portion of the output of the one-way hash function is used as the associated number identifying the one-time recovery credential in the credential sequence. Thus, each one-time recovery credential in the credential sequence is part of a number (a hash value) that also includes the associated number identifying the one-time recovery credential. For example, the one-way hash function may generate a 256-bit value, a portion of which (e.g., the first 128 or 160 bits) is used as the one-time recovery credential and another portion of which (e.g., the last 6 bits) is used as the identifier of the one-time recovery credential in the credential sequence. In this example, the credential sequence can be a sequence of 256-bit numbers, with each 256-bit number including both a one-time recovery credential and an identifier of that one-time recovery credential.

In such embodiments, when establishing the recovery key for device 202, the recovery key is selected so that when the desired number of one-time recovery credentials are generated for the credential sequence, the output values from the one-way hash function in generating the credential sequence result in unique (within the credential sequence) identifiers for the one-time recovery credentials in that credential sequence. Thus, each identifier of a one-time recovery credential in that credential sequence identifies only one one-time recovery credential in that credential sequence. If a recovery key is selected that does not result in a credential sequence having unique (within the credential sequence) identifiers for the one-time recovery credentials in that credential sequence, then a new recovery key is selected. New recovery keys continue to be selected until a recovery key that does result in a credential sequence having unique (within the credential sequence) identifiers for the one-time recovery credentials in that credential sequence is selected.

Additionally, in such embodiments, the number associated with the current one-time recovery credential is maintained in cryptographic store 224, analogous to the sequential numbers discussed above. One-time recovery credential generation module 238 receives the identifier of a particular one-time recovery credential in the credential sequence as part of key recovery request 254. One-time recovery credential generation module 238 obtains the recovery key from recovery key store 234 and uses the one-way hash function to generate hash values based on the recovery key as discussed above. For each generated hash value, module 238 checks whether the identifier of the associated one-time recovery credential included in the generated hash value is the identifier of the particular one-time recovery credential received as part of key recovery request 254. If the identifier included in the generated hash value is not the identifier received as part of key recovery request 254 then the next hash value is generated. However, if the identifier included in the generated hash value is the identifier received as part of key recovery request 254 then the one-time recovery credential included in that generated hash value is returned to intermediary 204 as recovery credential 256.

By using identifiers associated with the one-time recovery credentials that are not sequential numbers, additional security against malicious users or programs is provided. As discussed above, communication between device 202 and intermediary 204, and between intermediary 204 and key recovery service 206 need not be via a secure communication channel. By using identifiers other than sequential numbers, if a malicious user or program were to obtain an identifier of a particular one-time recovery credential, that malicious user or program would have no knowledge of where that particular one-time recovery credential is in the credential sequence. This makes it more difficult for such a malicious user or program to try to guess the identifier of a previous one-time recovery credential in the credential sequence if the malicious user or program were to attempt to later obtain a one-time recovery credential from key recovery service 206 for device 202.

Recovery credential 256 (and optionally a new one-time recovery credential encrypted with the current one-time recovery credential, as discussed above) is returned to intermediary 204, which in turn returns recovery credential 256 to a user of device 202. The user can input recovery credential 256 into device 202 (e.g., by typing in recovery credential 256 on a keypad or touchscreen). Alternatively, recovery credential 256 can be returned to device 202 rather than a user of device 202. Recovery credential 256 is the current one-time recovery credential for device 202, and thus can be used by key retrieval module 226 to decrypt the recovery (or other) key. Additionally, key retrieval module 226 generates (or receives) a new one-time recovery credential. This new one-time recovery credential is a one-time recovery credential in the credential sequence that is previous in the sequence relative to the current one-time recovery credential (recovery credential 256). The recovery (or other) key as previously encrypted with the current one-time recovery credential is deleted, and the recovery (or other) key encrypted with the new one-time recovery credential is saved in cryptographic store 224, resulting in this new one-time recovery credential becoming the current one-time recovery credential.

In one or more embodiments, a usage period is associated with each one-time recovery credential. This usage period can take different forms, such as a particular number of uses (e.g., a particular number of times the recovery key can be decrypted using the one-time recovery credential), a particular amount of time (e.g., a particular number of hours and/or days that the one-time recovery credential can be used to decrypted the recovery key), and so forth. An indication of this usage period is maintained (e.g., in cryptographic store 224), and used by key retrieval module 226 in decrypting the recovery (or other) key. If the authentication process fails (e.g., the user restarts device 202 but has still forgotten his or her password), then key retrieval module 226 can continue to use the one-time recovery credential most recently received from key recovery service 206 so long as the usage period still applies. If the usage period has elapsed, then device 202 obtains a new one-time recovery credential from key recovery service 206 in order to decrypt the recovery (or other) key.

Key retrieval module 226 can, for example, delay deleting the recovery (or other) key as previously encrypted with the current one-time recovery credential until after the usage period elapses. Thus, the user could repeatedly input the one-time recovery credential at device 202 to have the recovery (or other) key decrypted, until the usage period elapses. In response to the usage period elapsing, key retrieval module 226 deletes the recovery (or other) key as previously encrypted with the current one-time recovery credential, encrypts the recovery (or other) key with the new one-time recovery credential, and saves the recovery (or other) key encrypted with the new one-time recovery credential as the recovery (or other) key encrypted with the current one-time recovery credential in cryptographic store 224.

Additionally, in one or more embodiments key recovery service 206 monitors key recovery requests 254 to identify potential attacks by malicious users or programs. A variety of different monitoring can be performed, and the manner in which the monitoring is performed can vary based on the manner in which the one-time recovery credentials in the credential sequences are identified. For example, if the one-time recovery credentials in the credential sequences are numbers (e.g., sequential or non-sequential), then key recovery service 206 can maintain a record of previously received identifiers of one-time recovery credentials for device 202. If a next key recovery request 254 includes an identifier of a one-time recovery credential that is at least a threshold amount earlier in the credential sequence (e.g., 100 or 1000 locations earlier in the credential sequence) than a previously received identifier (e.g., the most recent previously received identifier for device 202), then key recovery service 206 can identify the key recovery request 254 as a potential attack. Such a request can be viewed as a potential attack because device 202 is expected to use the preceding one-time recovery credential in the sequence (e.g., decrement the identifier by a particular amount (e.g., 1) in situations in which the one-time recovery credentials in the credential sequences are sequential numbers) for each key recovery request, so the identifier being at least the threshold amount earlier in the credential sequence is not typical behavior by device 202 and thus could be from a malicious user or program.

By way of another example, if the one-time recovery credentials in the credential sequences are numbers (e.g., sequential or non-sequential), then key recovery service 206 can maintain a record of previously received identifiers of one-time recovery credentials for device 202. If a next key recovery request 254 includes an identifier of a one-time recovery credential that is at least a threshold amount later in the credential sequence than a previously received identifier (e.g., the most recent previously received identifier for device 202), then key recovery service 206 can identify a previous potential attack based on the key recovery request 254. Such a request can indicate a previous potential attack because a malicious user or program may have previously requested (and received) a one-time recovery credential earlier in the credential sequence than a legitimate user of device 202 would have requested as the next one-time recovery credential. So, when the legitimate user of device 202 requests a one-time recovery credential, the credential that the legitimate user requests is later in the sequence than the previously received identifier.

By way of yet another example, key recovery service 206 can maintain a record of when the most recently received key recovery request 254 was received, or a rate at which key recovery requests 254 are received. If greater than a threshold number of key recovery requests 254 are received within a threshold amount of time (e.g., more than 10 requests within an hour), then the key recovery requests 254 can be viewed as a potential attack. A high rate of key recovery requests can be viewed as a potential attack because although typographical and other errors by legitimate users and intermediaries 204 can be expected, a high rate of key recovery requests is not expected and thus can be viewed as a malicious user or program attempting to guess the identifier of a previous one-time recovery credential in a credential sequence.

In response to identifying a potential attack, key recovery service 206 can take a variety of different responsive actions. The responsive action can be to discontinue responding to key recovery requests 254 for the device 202 for which one-time recovery credentials are being requested in the potential attack, and optionally to report an event (e.g., sound an alarm, send an email or other notification, log a record of the potential attack, etc.). Alternatively, the responsive action can be to continue responding to key recovery requests 254 for the device 202 for which one-time recovery credentials are being requested in the potential attack, but to also report an event (e.g., sound an alarm, send an email or other notification, log a record of the potential attack, etc.).

Figure 3:
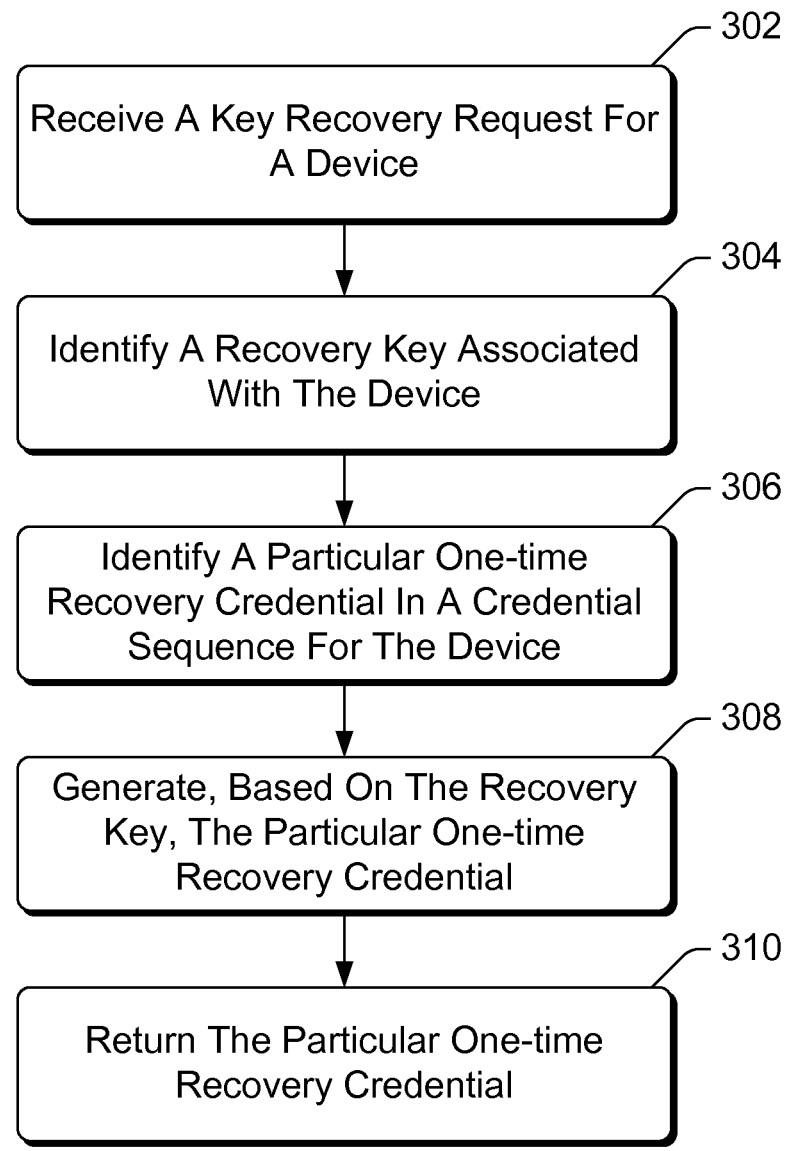
FIG. 3 is a flowchart illustrating an example process for a key recovery service implementing the one-time recovery credentials for encrypted data access in accordance with one or more embodiments.

FIG. 3 is a flowchart illustrating an example process 300 for a key recovery service implementing the one-time recovery credentials for encrypted data access in accordance with one or more embodiments. Process 300 can be carried out by, for example, key recovery service 106 of FIG. 1 or key recovery service 206 of FIG. 2, and can be implemented in software, firmware, hardware, or combinations thereof. Process 300 is shown as a set of acts and is not limited to the order shown for performing the operations of the various acts. Process 300 is an example process for a key recovery service implementing the one-time recovery credentials for encrypted data access; additional discussions of a key recovery service implementing the one-time recovery credentials for encrypted data access are included herein with reference to different figures.

In process 300, a key recovery request for a device is received (act 302). The key recovery request can be received from an intermediary entity on behalf of a user of the device or other entity, as discussed above.

A recovery key associated with the device is identified (act 304). The recovery key is previously provided to or otherwise obtained by the key recovery service, as discussed above.

A particular one-time recovery credential in a credential sequence for the device is identified (act 306). An identifier of the particular one-time recovery credential that is being requested by the device can be included in the key recovery request received in act 302 as discussed above.

Based on the recovery key, the particular one-time recovery credential is generated (act 308). The particular one-time recovery credential is generated using one or more functions based on the recovery key as discussed above. A new one-time recovery credential can also optionally be generated in act 308, and encrypted using the particular one-time recovery credential, as discussed above.

The particular one-time recovery credential generated in act 308 is returned in response to the key recovery request (act 310). The particular one-time recovery credential can be returned to an intermediary entity, as discussed above. The new one-time recovery credential, encrypted with the particular one-time recovery credential, can also be returned to the intermediary entity as discussed above.

Figure 4:
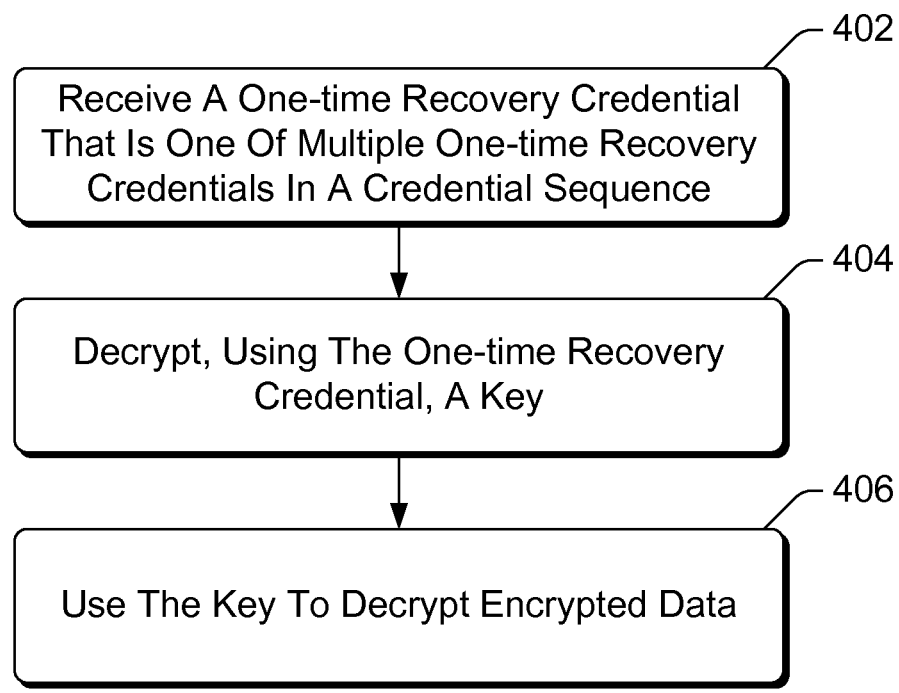
FIG. 4 is a flowchart illustrating an example process for a device implementing the one-time recovery credentials for encrypted data access in accordance with one or more embodiments.

FIG. 4 is a flowchart illustrating an example process 400 for a device implementing the one-time recovery credentials for encrypted data access in accordance with one or more embodiments. Process 400 can be carried out by, for example, a device 102 of FIG. 1 or device 202 of FIG. 2, and can be implemented in software, firmware, hardware, or combinations thereof. Process 400 is shown as a set of acts and is not limited to the order shown for performing the operations of the various acts. Process 400 is an example process for a device implementing the one-time recovery credentials for encrypted data access; additional discussions of a device implementing the one-time recovery credentials for encrypted data access are included herein with reference to different figures.

In process 400, a one-time recovery credential is received (act 402), the one-time recovery credential being one of multiple one-time recovery credentials in a credential sequence. The one-time recovery credential can be received, for example, as a user input as discussed above.

A key is decrypted using the one-time recovery credential (act 404). The key that is decrypted in act 404 can be the recovery key, or alternatively another key used to encrypt the data on storage media 110 (or one or more other keys used to encrypt the data on storage media 110) as discussed above. Additionally, the one-time recovery credential can be used a single time to decrypt the key, or alternatively can be used multiple times to decrypt the key until a usage period elapses as discussed above.

The key is used to decrypt encrypted data on a storage media of the device implementing process 400 (act 406). The key can be used in various manners to decrypt the encrypted data, such as used to decrypt one or more other keys that in turn decrypt the encrypted data, used as a symmetric key to decrypt the encrypted data, and so forth as discussed above.

The one-time recovery credentials for encrypted data access techniques discussed herein support various usage scenarios. For example, a user may forget the password to access encrypted data on his or her computer, and provide an input to the computer indicating such. The computer displays an identifier of a one-time recovery credential (e.g., a particular number) on a screen of the computer, and the user uses his or her phone to call a help desk technician. The user proves to the help desk technician that he or she is a legitimate user of the computer, and tells the help desk technician the identifier displayed on the screen of the computer. The help desk technician supplies the identifier to a key recovery service along with an identifier of the user's computer, and the key recovery service returns the one-time recovery credential to the help desk technician. The help desk technician provides the one-time recovery credential to the user via the user's phone (e.g., speaks the one-time recovery credential to the user, sends a text message to the user with the one-time recovery credential, etc.), which the user inputs to the computer to gain access to the encrypted data on his or her computer.

By way of another example, a similar user may be out of the office and unable to access the help desk technician for a few days. A usage period associated with the one-time recovery credential can allow the user to continue to access the encrypted data on his or her computer (e.g., for the few days), even though his or her computer may have no network access and he or she may not be able to contact a help desk technician.

Various actions such as communicating, receiving, sending, storing, generating, obtaining, and so forth performed by various modules are discussed herein. It should be noted that the various modules can cause such actions to be performed. A particular module causing an action to be performed includes that particular module itself performing the action, or alternatively that particular module invoking or otherwise accessing another component or module that performs the action (or performs the action in conjunction with that particular module).

Figure 5:
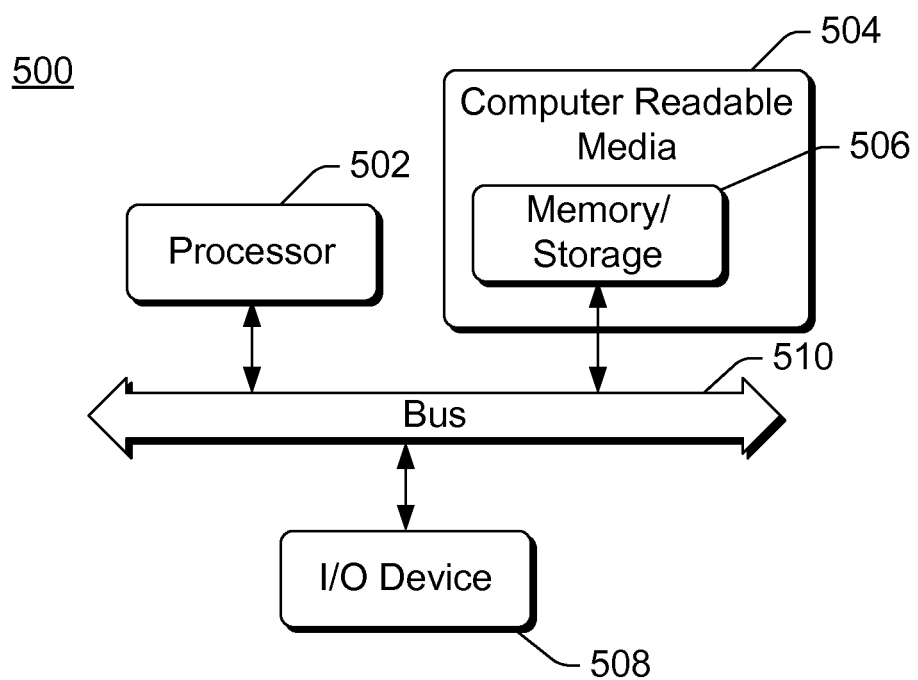
FIG. 5 illustrates an example computing device that can be configured to implement the one-time recovery credentials for encrypted data access in accordance with one or more embodiments.

FIG. 5 illustrates an example computing device 500 that can be configured to implement the one-time recovery credentials for encrypted data access in accordance with one or more embodiments. Computing device 500 can be, for example, a device 102 or a device implementing device 102 of FIG. 1, an entity of intermediary layer 104 of FIG. 1, a device implementing at least part of key recovery service 106 of FIG. 1, a device 202 of FIG. 2, an intermediary 204 of FIG. 2, a device implementing at least part of key recovery service 206 of FIG. 2, and so forth.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or nonvolatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, applications, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the one-time recovery credentials for encrypted data access techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a key recovery service, the method comprising:
    receiving, by the key recovery service, a key recovery request for a device;
    identifying a recovery key associated with the device;
    identifying a first one-time recovery credential in a sequence of multiple one-time recovery credentials, previous one-time recovery credentials in the sequence being indeterminable given subsequent one-time recovery credentials in the sequence, the first one-time recovery credential in the sequence being identified by an identifier that is generated using a single hash function that includes the recovery key as an input;
    generating, under control of a processor, the first one-time recovery credential in the sequence by using the single hash function that is also used to generate the identifier of the first one-time recovery credential;
    returning the first one-time recovery credential in response to the key recovery request; responsive to returning the first one-time recovery credential, causing access to the recovery key associated with the device; and
    monitoring key recovery requests and reporting an event when the identifier of the first one-time recovery credential is at least a threshold amount earlier in the sequence of multiple one-time recovery credentials than an identifier included in a previously received key recovery request.

2. A method as recited in claim 1, the identifier of the first one-time recovery credential being generated using one of multiple sequential numbers representing a particular location in the sequence.

3. A method as recited in claim 1, an initially used one-time recovery credential in the sequence being generated by iteratively hashing the recovery key a number of times equal to at least a total number of one-time recovery credentials that are expected to be needed over a given time period.

4. The method as recited in claim 1, the identifier of a one-time recovery credential being a first portion of a hash value generated by the single hash function and the one-time recovery credential being a second portion of the hash value.

5. The method as recited in claim 1, the receiving the key recovery request comprising receiving the key recovery request from an intermediary on behalf of an entity making the key recovery request, and the returning the first one-time recovery credential comprising returning the first one-time recovery credential to the intermediary.

6. The method as recited in claim 5, the receiving the key recovery request comprising receiving the key recovery request from an intermediary on behalf of the user communicating with the intermediary using an additional device other than the device and the returning the first one-time recovery credential in response to the key recovery request comprising returning the first one-time recovery credential to the device.

7. The method as recited in claim 1, the receiving the key recovery request comprising receiving the key recovery request via an unsecure communication channel, and the returning the first one-time recovery credential comprising returning the one-time recovery credential via an unsecure communication channel.

8. The method as recited in claim 1, further comprising monitoring key recovery requests and reporting an event when the identifier of the first one-time recovery credential is at least a threshold amount later in the sequence of multiple one-time recovery credentials than a previously received key recovery request.

9. The method as recited in claim 1, further comprising monitoring key recovery requests and reporting an event when greater than a threshold number of key recovery requests for the device are received within a threshold amount of time.

10. The method as recited in claim 1, further comprising: generating, using the recovery key, a new one-time recovery credential that is one of the multiple one-time recovery credentials in the sequence of multiple one-time recovery credentials, the new one-time recovery credential being previous to the first one-time recovery credential in the sequence;
    encrypting, using the first one-time recovery credential, the new one-time recovery credential; and
    returning the new one-time recovery credential encrypted with the first one-time recovery credential in response to the key recovery request.

11. The method as recited in claim 1, further comprising receiving from the device, prior to receiving the key recovery request, the recovery key.

12. One or more computer storage memories having stored thereon multiple instructions that, when executed by one or more processors of a device, cause the one or more processors to:
    receive, at the device, a first one-time recovery credential that is one of multiple one-time recovery credentials in a sequence of one-time recovery credentials, previous one-time recovery credentials in the sequence being indeterminable given subsequent one-time recovery credentials in the sequence;
    decrypt, by the device and using the first one-time recovery credential, a recovery key encrypted with the first one-time recovery credential and associated with the device;
    use the recovery key to decrypt encrypted data stored on a first storage memory of the device;
    generate, at the device, a second one-time recovery credential that is one of the multiple one-time recovery credentials in the sequence of one-time recovery credentials, the second one-time recovery credential being previous to the first one-time recovery credential in the sequence; and
    receive a report of an event when an identifier of the first one-time recovery credential is at least a threshold amount earlier in the sequence of one-time recovery credentials than a previously received identifier.

13. The one or more computer storage memories as recited in claim 12, the multiple instructions further causing the one or more processors to allow the first one-time recovery credential to be used to decrypt the recovery key encrypted with the first one-time recovery credential until a usage period associated with the first one-time recovery credential elapses.

14. The one or more computer storage memories as recited in claim 12, the multiple instructions further causing the one or more processors to:
    encrypt, using the second one-time recovery credential, the recovery key.

15. The one or more computer storage memories as recited in claim 12, the multiple instructions further causing the one or more processors to delete the recovery key encrypted with the first one-time recovery credential.

16. The one or more computer storage memories as recited in claim 12, the one-time recovery credentials in the sequence each being identified by one of multiple associated sequential numbers, the second one-time recovery credential having an associated sequential number less than a sequential number associated with the first one-time recovery credential.

17. The one or more computer storage memories as recited in claim 12, the multiple instructions further causing the one or more processors to display, prior to receipt of the first one-time recovery credential, the identifier of the first one-time recovery credential in the sequence.

18. The one or more computer storage memories as recited in claim 12, the instructions causing the one or more processors to receive the first one-time recovery credential comprising instructions causing the one or more processors to receive a user input that is the first one-time recovery credential.

19. A method implemented in a key recovery service, the method comprising:
    receiving from an intermediary, a key recovery request for a device;
    identifying, by the key recovery service, a recovery key associated with the device; identifying, from the key recovery request, a first one-time recovery credential in a sequence of multiple one-time recovery credentials, previous one-time recovery credentials in the sequence being indeterminable given subsequent one-time recovery credentials in the sequence, the first one-time recovery credential being identified by one of multiple sequential numbers, each of the multiple sequential numbers being associated with one of the multiple one-time recovery credentials in the sequence;
    generating, under control of a processor, the first one-time recovery credential in the sequence by generating an initial one-time recovery credential in the sequence by using the recovery key as an input to a one-way hash function, and generating subsequent one-time recovery credentials in the sequence until the first one-time recovery credential is generated by repeatedly providing a previous output of the one-way hash function as an input to the one-way hash function;

returning to the intermediary the first one-time recovery credential in response to the key recovery request; and monitoring key recovery requests and reporting an event when the identifier of the first one-time recovery credential is at least a threshold amount earlier in the sequence of multiple one-time recovery credentials than an identifier included in a previously received key recovery request.

20. A method as recited in claim 19, the receiving the key recovery request comprising receiving the key recovery request via an unsecure communication channel, and the returning the first one-time recovery credential comprising returning the one-time recovery credential via an unsecure communication channel.

* * * * *